March 17, 1942.    G. A. PULLIS    2,276,669
FREQUENCY INDICATOR
Filed Dec. 28, 1940
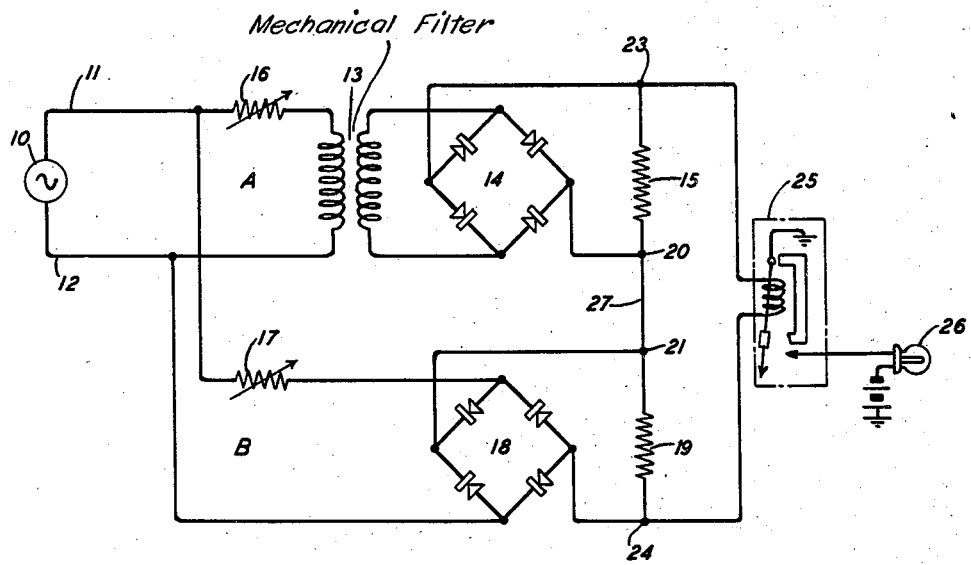
INVENTOR
G. A. PULLIS
BY
ATTORNEY Patented Mar. 17, 1942

2,276,669

UNITED STATES PATENT OFFICE 2,276,669

FREQUENCY INDICATOR

George A. Pullis, Hoboken, N. J., assignor to Bell Telephone Laboratories, Incorporated, New York, N. Y., a corporation of New York Application December 28, 1940, Serial No. 372,211

8 Claims. (Cl. 177—311)

This invention relates to frequency indicators and particularly to off-frequency alarm circuits such as are employed in the telephone plant.

Certain ringing equipment in the telephone plant is designed to function on alternating current of a predetermined frequency and to operate satisfactorily when the frequency of the supply source varies in either direction within predetermined small limits. Usually the desirable frequency is 135 cycles, with upper and lower permissible limits of 137.5 and 132.5 cycles, respectively. It is, therefore, essential, in order to insure the accurate operation of such equipment, that provision be made in the telephone plant for indicating when the frequency of the supply source has varied to such an extent as to reach the upper or lower permissible limits.

It is the object of this invention to devise an improved method of and means for indicating a frequency variation of definite magnitude above or below a predetermined desirable frequency of an alternating current source.

This object is attained in accordance with a feature of the invention by the provision of an alarm circuit which functions to faithfully indicate a variation, of predetermined magnitude, in the frequency of an alternating current source.

Another feature of the invention contemplates an alarm circuit which functions to give an alarm at the same frequencies regardless of the voltage of the frequency source.

These and other features of the invention will be best understood from the following detailed description made with reference to the accompanying drawing which is a schematic of a frequency indicator and off-frequency alarm circuit embodying the features of the invention.

The source of alternating current, whose departures in frequency from a predetermined desirable frequency are to be detected, is shown at 10. This source may be an alternating current generator, a motor-generator set, or any other suitable source of alternating current. Extending from the terminals of the source 10 and connected thereto by the leads 11 and 12 are two channels A and B.

The channel A consists of a variable resistance 16, a mechanical filter 13, a full-wave rectifier 14 and a resistance element 15. The variable resistance 16 is included in one of the line wires of channel A between the source 10 and the filter 13. The output terminals of the filter 13 are connected to the alternating current terminals of rectifier 14, while the resistance 15 is connected across the direct current terminals thereof.

The channel B consists of a variable resistance 17, a full-wave rectifier 18, and a resistance element 19. The variable resistance 17 is included in one of the line wires of channel B between the source 10 and the rectifier 18. The resistance 19 is connected across the direct current terminals of rectifier 18.

Similarly poled terminals 20 and 21 of resistances 15 and 19, respectively, are interconnected by the lead 27, whereas the other pair of similarly poled terminals 23 and 24 of resistance elements 15 and 19 are interconnected by the operating coil of a voltage responsive signal control device, or meter 25.

From the description thus far advanced, it is apparent that the voltages built up across resistance elements 15 and 19 are in phase opposition and that the coil of meter 25 is subjected to a voltage equal to the difference between these voltages.

The meter 25 may be of the type which is equipped with a magnetic arm and a magnetized contact element so that, when a condition of no current in the coil of meter 25 prevails the magnetic arm is attracted to the magnetized contact to complete an operating circuit for the lamp signal 26.

The mechanical filter 13 is designed to have a frequency characteristic such that, at a particular frequency above or below a predetermined desirable frequency, it introduces a loss of 6 decibels. In other words, the frequency characteristic of the filter 13 is such that, at these particular frequencies, the voltage built up across resistance 15 is half of the voltage built up across it when the frequency of the source is at the predetermined desirable frequency, to which frequency the filter 13 is tuned.

By means of the variable resistances 16 and 17 the voltage built up across resistance 15 is adjusted to be twice that built up across resistance 19 at the predetermined desirable frequency, that is, at the frequency to which the filter 13 is tuned.

The output of the alternating current source 10 divides into two parts. One part passing through channel B is rectified at 18 and builds up a negative potential across resistance 19. The other part passes through channel A, through the mechanical filter 13, is rectified at 14, and builds up a positive potential across the resistance 15. At the predetermined desirable frequency, which will be assumed to be 135 cycles, the voltage across resistance 15 will be 2E, whereas the voltage built up across resistance 19 will be E, in accordance with the setting of the variable resistances 16 and 17 as above described. The coil of meter 25 is, accordingly, subjected to a voltage of 2E—E or E volts, and the magnetic arm will float at some high scale reading and the circuit to the signal lamp 26 will be open. No signal or alarm is, therefore, in evidence when the frequency of the source 10 is at the assumed desirable frequency of 135 cycles.

When the frequency of the source 10 is at a particular frequency above or below the predetermined desirable frequency, 132.5 or 137.5 cycles for example, the filter 13 introduces a 6-decibel loss, so that the potential across resistance 15, instead of being 2E volts, is now E volts. The voltage built up across resistance 19 is still E volts and, since these voltages are now equal in magnitude and in phase opposition, there is a net voltage of zero volts impressed on the operating winding of meter 25, the magnetic arm thereof it. Under this condition of no current in the winding of meter 25, the mangetic arm thereof is attracted to the magnetized contact and the circuit to signal lamp 26 is completed. The operation of signal 26 indicates that the frequency of the source 10 is no longer at the predetermined desirable frequency, assumed to be 135 cycles.

In order to clearly illustrate the fact that the circuit arrangement of this invention will function to bring in an alarm at precisely the particular frequencies above or below the predetermined desirable frequency, regardless of variations in the voltage of the supply source 10, the following example is offered:

At the frequency to which the filter 13 is tuned (assumed to be 135 cycles), the current through the winding of meter 25 will be a maximum, but will depend on voltage for its amplitude. However, at particular frequencies above or below the predetermined frequency (assumed to be 132.5 or 137.5 cycles), the current in the meter winding will always be zero regardless of the voltage of the source 10.

Let it be assumed that the source 10 is a 135-cycle source of 10 volts. The resistance 16 is adjusted so that a voltage of 1 volt is developed across resistance 15, and the resistance 17 is adjusted so that a voltage of .5 volt appears across resistance 19. The voltages across resistances 15 and 19 are selected so that their difference is equal to the filter loss at 13, at the particular frequencies at which it is required to provide an alarm. In the case at hand, there is a net voltage of .5 volt (at 135 cycles) across the winding of meter 25 and the arm thereof will be maintained at a position separated from its contact and the alarm signal 26 will not be energized. This condition prevails as long as the frequency of source 10 is 135 cycles.

At the assumed particular frequencies, 132.5 and 137.5 cycles, the voltage across resistance 15 will drop to .5 volt, due to the 6-decibel loss in the filter 13, and will, therefore, equal the potential drop across resistance 19. These voltages, being equal in magnitude and in phase opposition, cancel and no current will flow in the winding of meter 25. The meter arm will, accordingly, be attracted to the magnetic contact and the circuit for operating the signal 26 will be completed.

Let it now be assumed that the voltage of the 135-cycle source 10 increases to 20 volts. The voltage across resistance 15 will be 2 volts and the voltage across resistance 19 will be 1 volt. A net voltage of 1 volt accordingly is impressed on the winding of meter 25, and, as in the preceding case (135 cycles), the pointer will float at some high scale reading.

Should the frequency of source 10 now become 132.5 or 137.5 cycles, the voltage across resistance 15 will drop to 1 volt (due to the 6-decibel loss in filter 13) and will equal the voltage drop across resistance 19. Since these voltages are equal in magnitude and opposite in phase, they cancel, and no current will flow in the coil of meter 25. Under this no-current condition the alarm signal 26 is operated.

The above example clearly illustrates that the circuit described will always bring in an alarm at particular frequencies above or below a predetermined desirable frequency regardless of the voltage of the source 10.

It is apparent that the circuit described may also be employed as a means for obtaining a visual indication that the generator 10 is running at proper speed.

In the foregoing description, the filter has been indicated as introducing a 6-decibel loss and the resistances 16 and 17 adjusted so as to produce a voltage across the terminals of resistance 15 of twice the magnitude of that across the resistance 19 at the predetermined frequency. It is to be understood that these values have been chosen for descriptive purposes only, and that the same result is obtained regardless of the loss introduced by the filter, so long as the adjustment is such that the difference in voltage across resistances 15 and 19 is equal to the filter loss at the particular frequencies at which it is required to provide an alarm.

What is claimed is:

1. In a system for indicating particular frequencies above and below a predetermined frequency, a source of current having the predetermined frequency as its normal frequency, a pair of channels fed from said source and each terminating in a resistance element, means included in each channel for subjecting said resistances to direct current voltages, means for adjusting the voltages across said resistances so as to provide a voltage across one of said resistances of a greater value than the voltage across the other resistance when the frequency of said source is the predetermined frequency, means for introducing a loss in one of said channels when the frequency of said source is a particular frequency above or below the predetermined frequency, equal to the difference between the voltages across said resistances, a meter, and means for connecting said meter to said resistances so as to subject it to the difference in voltage between the voltages across said resistances.

2. In a system for indicating a particular frequency, above or below a predetermined frequency, of a source of alternating current, a pair of channels fed from said source, a meter, means for adjusting the potentials at the terminals of each of said channels to values such that the value of one potential is twice that of the other when the frequency of said source is the predetermined frequency, means included in one of said channels responsive to a change in frequency of said source from the predetermined frequency to either of the particular frequencies for halving the one said potential, and means for interconnecting the terminals of said channels and said meter so as to subject said meter to a potential equal to the difference between the potentials at the terminals of said channels.

3. In a circuit arrangement for indicating a particular frequency above or below a predetermined frequency, a source of alternating current having the predetermined frequency as its normal frequency, a pair of channels connected to said source, each terminating in a resistance element, a lead interconnecting a terminal of each of said channels, a meter connected between the other terminal of each of said channels, whereby said meter is subjected to a potential equal to the algebraic sum of the potentials across said resistances, means interconnecting each resistance to its respective channel so that the potentials impressed thereon are in phase opposition, means for adjusting the potentials across said resistances to values such that the potential across one is double that across the other when the frequency of said source is the predetermined frequency, and means included in one of said channels for halving the potential across its associated resistance when the frequency of said source is a particular frequency above or below the predetermined frequency.

4. In a circuit arrangement for indicating a particular frequency above or below a predetermined frequency, a source of alternating current of the predetermined frequency, a pair of channels connected to and supplied from said source, and each channel having a pair of output terminals, means included in one of said channels for adjusting the potential at the output terminals to a value of 2E volts when the frequency of said source is the predetermined frequency, means included in the other of said channels for adjusting the potential at the output thereof to a value of E volts, a meter, means interconnecting the terminals of said channels and said meter so as to subject the meter to a voltage 2E—E when the frequency of said source is the predetermined frequency, means included in the first of said channels effective when the frequency of said source is a particular frequency above or below the predetermined frequency for altering the potential across the output terminals of said one channel to a value equal in magnitude to the potential across the output terminals of the other channel, whereby the said meter is subjected to a potential E—E, and a signal device controlled by said meter.

5. A frequency indicating system comprising a pair of transmission channels fed from a single source of alternating current, one of said channels including a rectifier fed directly from said source, and the other of said channels including a rectifier fed from said source through a mechanical filter having a characteristic such that it introduces a 6-decibel loss at a certain frequency above or below a predetermined frequency of said source, a resistance connected across the output of each of said rectifiers, means included in each of said channels for adjusting the output voltages to said rectifiers impressed on said resistances so that their difference equals the loss introduced by said filter at the said certain frequencies, means for interconnecting said resistances so that their voltages are in phase opposition, and a meter included in said interconnecting means and subject to the difference between the voltages impressed on said resistances, whereby said meter is subjected to zero voltage when the frequency of said source varies a predetermined amount in either direction from the predetermined frequency.

6. In a system for indicating a particular frequency above or below a predetermined frequency of a source of alternating current, a pair of channels fed from said source, a rectifier included in each of said channels, a resistance element connected across the output terminals of said rectifiers, a lead connecting the positive terminal of one resistance element with the positive terminal of the other resistance element, a meter bridge across the two negative terminals of said resistance elements, whereby the meter is subjected to the difference between the voltages impressed on said resistance elements, means included in each channel for maintaining the terminal voltage thereof to values such that the voltage across the first channel is twice that across the second channel when the frequency of said source is the predetermined frequency, and means responsive to a variation in the frequency of said source from the predetermined frequency to one of the particular frequencies for halving the voltage across the said first channel, whereby the net voltage impressed on said meter when the frequency of said source is one of the particular frequencies, is zero.

7. A frequency indicating system comprising a pair of transmission channels fed from a single source of alternating current, one of said channels including a rectifier fed directly from said source, and the other of said channels including a rectifier fed from said source through a mechanical filter having a characteristic such that it introduces a particular decibel loss at certain frequencies above and below a predetermined frequency, a resistance connected across the output of each of said rectifiers in relative phase opposition and having values such that their voltage difference is equal to the filter decibel loss at said certain frequencies, whereby the voltage drops across said resistances at said certain frequencies are equal in magnitude irrespective of the voltage of the said source of alternating current, and a signal control device connected across said resistances.

8. The combination in a frequency indicating arrangement of a source of alternating current having a normal frequency $f_0$, a pair of channels connected to said source of current and each terminating in a resistance element, means included in each of said channels for translating alternating current transmitted therethrough into direct current so as to build up a direct current potential across each of said resistances, resistance means included in each of said channels so adjusted as to render the potential across one of said resistances double the magnitude of the potential across the other of said resistances when the frequency of said source is $f_0$, means included in one of said channels, effective when the frequency of said source deviates in either direction a predetermined amount from the frequency $f_0$ for halving the potential across the resistance element associated with said one channel, a meter, and means for interconnecting said resistances differentially with respect to the operating coil of said meter whereby said coil is subjected to a potential equal to that across one of said resistances when the frequency of said source is $f_0$, and to zero potential when the frequency of said source deviates in either direction a predetermined amount from the frequency $f_0$.

GEORGE A. PULLIS.